(12) United States Patent
Schulein (10) Patent No.: US 7,114,685 B1
(45) Date of Patent: Oct. 3, 2006

(54) WING FOR AN AIRCRAFT OR SPACECRAFT

(75) Inventor: Erich Schulein, Scheden (DE)

(73) Assignee: Deutsches Zentrum fur Luft-und, Bonn (DE)

( * ) Notice: Subject to any disclaimer, the term of this patent is extended or adjusted under 35 U.S.C. 154(b) by 0 days.

(21) Appl. No.: 11/142,511

(22) Filed: Jun. 1, 2005

(30) Foreign Application Priority Data

Jun. 1, 2004 (DE) .................... 10 2004 026 625
Feb. 4, 2005 (DE) .................... 10 2005 005 234

(51) Int. Cl.
  *B64C 21/10* (2006.01)
(52) U.S. Cl. .................... 244/199.1; 244/53 B
(58) Field of Classification Search ............. 244/53 B, 244/199.1, 200, 130, 35 R, 34 R, 357; 416/228, 416/224
  See application file for complete search history.

(56) References Cited

U.S. PATENT DOCUMENTS

| | | | | |
|---|---|---|---|---|
| 725,639 | A * | 4/1903 | Webber ...................... | 416/228 |
| 1,862,827 | A * | 6/1932 | Parsons et al. ............. | 416/224 |
| 2,959,916 | A * | 11/1960 | Carlton et al. ............ | 244/53 B |
| 3,008,291 | A * | 11/1961 | Hardgrave, Jr. ............ | 244/130 |
| 3,184,183 | A * | 5/1965 | Plasecki .................... | 244/23 R |
| 3,365,126 | A * | 1/1968 | Stoffer et al. ............... | 416/228 |
| 4,089,618 | A * | 5/1978 | Patel .......................... | 416/228 |
| 4,291,853 | A * | 9/1981 | Sigalla .................... | 244/199.1 |
| 5,088,665 | A * | 2/1992 | Vijgen et al. ............... | 244/200 |
| 5,779,189 | A * | 7/1998 | Hamstra et al. .......... | 244/53 B |

FOREIGN PATENT DOCUMENTS

| DE | 10 2004 026 625.5 | 6/2004 |
|---|---|---|
| DE | 10 2005 005 234.7 | 2/2005 |
| WO | 829 424 B1 | 4/2003 |

OTHER PUBLICATIONS

D. Bushnell, Supersonic Aircraft Drag Reduction, AIAA Paper 90-1596, Jun. 1990, 24, pages.
Bertin J. & Smith M., Aerodynamics for Engineers, Prentice-Hall, 1979, pp. 186-217; pp. 296-307; pp. 330-349.
Belotserkovskii S.M. et al., Gitterflügel (Russian: Reschet-Schatye Kryl'Ja), Moskau, Maschinostroenie, 1985, 320 S (Russian) (English translation: Lattice Wings, also called wings with internal framework, machine translated by: Foreign Technology Divison United State Airforce, smooth translated original text, errors corrected and retyped by Missile And Space Intelligence Center United States Army, 1985, T.E. Martin, R.T. Wintey, D. Kleenias, 191 pages.
Washington W.D. and Miller M.S., A New Concept for Missile Strability and Control, AIAA Paper, 93-0035, 31st Aerospace Sciences Meeting & Exhibit, Jan. 1993, 10 pages.
Washington W.D. and Miller M.S., Experimental Investigations of Grid Fin Aerodynamics: A Synopsis of Nine Wind Tunnel and Three Flight Tests. Missile Aerodynamics, RTO-MP-5, May 1998, pp. 10-1-10-14.
Fournier E.Y., Wind Tunnel Investigation of Grid Fin and Conventional Planar Control Surfaces, AIAA Paper, 2001-0256, 39th Aerospace Sciences Meeting & Exhibit, Jan. 2001, 11 pages.

* cited by examiner

*Primary Examiner*—Galen Barefoot
(74) *Attorney, Agent, or Firm*—Thomas, Kayden, Horstemeyer & Risley, LLP

(57) ABSTRACT

The invention relates to a wing, a wing, a tail unit or grid fins for a flying object moving with supersonic speeds. The wing comprises leading edges and tailing edges.

According to the invention, the contour of at least one of the leading contour and the tailing contour has a meandered shape.

By means of the inventive meandered contours the wave drag of the flying object may be decreased. The inventive design of the leading or tailing edges of a wing can be used for aircrafts, spacecrafts, missiles, projectiles and the like.

15 Claims, 6 Drawing Sheets

WING FOR AN AIRCRAFT OR SPACECRAFT

CROSS REFERENCE TO RELATED APPLICATIONS

This application claims priority to co-pending German Patent Application No. 10 2004 026 625.5 entitled "Gitterflügel", filed Jun. 1, 2004. Additionally the application claims priority to co-pending German Patent Application No. 10 2005 005 234.7 entitled "Trag- oder Leitelement", filed Feb. 4, 2005.

FIELD OF THE INVENTION

The present invention generally relates to lifting, tail or control surfaces, named further uniform wings (in the following "wings") for flying objects as aircrafts, spacecrafts, projectiles or missiles for use with transonic, supersonic or hypersonic speeds.

BACKGROUND OF THE INVENTION

The drag of air leads to energy losses that increase exponentially with increasing speed of a flying object. Furthermore, the drag leads to mechanical loads and stresses acting upon the constructive elements of the flying object. These loads and stresses have to be considered when dimensioning the flying object. Accordingly, the drag influences the minimal dimension of the constructive elements. However, increased dimensions due to the acting loads and stresses lead to an increased consumption of the energy source of the propulsion when changing or maintaining the speed of the aircraft. Additionally, under certain conditions the increased drag could reduce the payload of the flying object. Investigations have shown that a change of the total drag of 1% may correlate to a change of the payload of approximately 5 to 10% in a modern commercial aircraft, cp.

[1]. D. Bushnell, Supersonic Aircraft Drag Reduction, AIAA Paper 90-1596, June 1990[1].

Document [1], which is incorporated entirely herein by reference, contains an overview on common technologies for reducing the drag of an aircraft.

Due to an exponential dependence of the drag on the flight speed for supersonic flying object a reduction of the total drag of 1% leads to a further increase of the payload.

Usually the outer shape of wings located in the airflow is the result of an optimization depending on a lot of different requirements. One such requirement is that the wing has to provide high performance throughout a large range of speeds. The aforementioned requirement is commonly fulfilled for wings used for transonic or supersonic aircrafts by variable sweep wings (swing-wings) or by providing cranked delta planform. Both these applications may lead to a low wave drag for a use of the wing during cruise speeds as well as a sufficient lift force during take-off and landing.

In a lot of cases the basic aerodynamic design of the wings is determined by means of theoretical or numerical models requiring wings of different known types of basic designs, cp. [1]. Examples for such simple shapes of wings are those being describable by means of a two-dimensional analysis.

[2] Bertin J. & Smith M., Aerodynamics for Engineers, Prentice-Hall, 1979, 410 p. [2], which is incorporated entirely herein by reference, contains an overview concerning the knowledge for the reduction of the drag for planar wings.

SUMMARY OF THE INVENTION

The present invention relates to a wing usable for at least one of a supporting function, providing lifting or control forces. The extent of the aforementioned functions could vary during the use of the flying object, e.g. change with a change of the speed or change due to an automated adaptation, in particular an adaptation of the inclination angle of the wing with respect to the airflow.

The wing is used for any flying object which is designed and adapted to move with transonic, supersonic or hypersonic speeds. These speed ranges include flight conditions with the whole flying object moving with supersonic speed as well as flight conditions with supersonic speeds only in local areas of the flying object.

According to the invention the wing comprises a contour of the leading or trailing edges, whereas at least one of those is meandered. This means that subsections of the meandered contour are located in front of other subsections. Thus, at least subsections are not arranged (completely) transverse to the flow direction but with angle of inclination to the flow direction which is smaller than 90°. The flow approaches the different subsections at different times. After first rough estimations this leads to an improvement of the wave drag of the wing because of the meandered contour of approximately between 40% and 70%. Also the lift-to-drag ratio, which is the relation between the lift and the drag forces induced by the wing can be improved to the same extent.

The airflow related to supersonic speeds of flying objects causes shock waves. As one result of the meandered design of the leading edge contours, the caused crossing shock waves interaction can leads to further reducing of wing's wave drag.

The novel wing in some instances leads to the following advantages:

As a first physical effect the novel wing leads to a change of the compressibility factor. With an increase of an inclination angle of the wing with meandered contour the increase of the pressure coefficient will be influenced in a positive way. In a first approximation only the flow component directed perpendicular to the leading edge is disturbed, whereas the component of the speed directed parallel to the leading edge is not disturbed. A superposition of the both flow components leads to a curved or cranked streamline of the airflow.

As a second physical effect it should be noted that critical flow conditions require that the flow component which is directed perpendicular to the leading edge exceeds sonic speed, wherein the effective Mach number which correlates with the projection to the aforementioned direction is smaller than the real Mach number. The effective Mach number determines the force coefficients of a comparable swept wing, which have to be corrected by the dynamic pressure of the actual flow. This results in a reduction of the lift-to-drag ratio, wherein the drag coefficient decreases faster than the lift coefficient. For instance, it is assumed that for small inclination angles the lift coefficient is direct proportional to $\cos^2(\lambda)$ and the drag coefficient is direct proportional to $\cos^3(\lambda)$, wherein $\lambda$ corresponds to the sweep angle. Accordingly, for comparable flow conditions the relation of the lift to the drag (so the lift-to-drag ratio for the wing comprising a swept leading edge (lift-to-drag_ratio_new)) is always larger than the lift-to-drag_ratio_old for unswept common wing, so that the equation lift-to-drag-ratio_new=lift-to-drag-ratio_old/cos($\lambda$)

holds in a first approximation. For an effective Mach number smaller than 1 (subsonic leading edge) the total drag force can be further reduced due to the fact that for an appropriate profile shape of the wing the effect of the leading edge suction could occur, which is well known for planar wings at subsonic speeds (cp. also [2], the cited portion of which is incorporated herein by reference).

The danger of erosion or sublimation/melting losses of the wings for use at hypersonic flight speeds requires thicker or blunter leading edges for the constructive design of the wings. Those designs lead to an additional wave drag of common wings suitable for use with these high speeds. The inventive concept leads to a significantly smaller effective Mach number at the leading edges of the wing. Thus, undesired and dangerous erosion or sublimation/melting losses can be avoided. On the other hand, the edges may have a thinner design or comprise a sharper or spikier leading edge, which leads to a further reduced wave drag.

The meandered edges, in particular being designed in a wavy, bidirectional manner, can be of any curvilinear shape. The choice of an appropriate shape can consider the manufacturing facilities,
the strength requirements,
the flow speeds expected throughout the flight,
the speed profile for changed flight speeds,
the desired superposition of shock waves,
the space available and/or
the passably chord size of the wing.

Subsections with different slopes, with slopes continuously changing or with regions of discrete constant values of the slope can be adapted to build an platform suitable for the flight conditions. The edges can be meandered in its entirety or only in one or several subsections.

According to the invention the aforementioned advantages of the meandered design of the edges of the contour can be combined with a contour comprising a sweep, if the contour is locally meandered and comprises a global sweep. This means that in a small scale the contour is meandered, for instance with a contour comprising different "teeth", wherein the "wavelength" of the meandered contour could be smaller than the length of the edge, whereas in a larger scale the contour or an "averaged contour" is not oriented transverse to the flow direction but the longitudinal axis of the flying object and a global, averaged artificial line at the edge of the wing builds an angle between 0° and 90°, which is open in opposite direction to the flight direction.

According to another embodiment the wing comprises a maximum protruding from the wing and two minima located spaced apart from the maximum or located externally. Thus, the contour comprises "peaks" protruding into the airflow with adjacent "valleys". The "valleys" are built by the (external) minima. They may be built in particular in the area of the upper and lower surfaces of the wing as well as retrograde areas of the meandered edges. As a consequence, the local sweep may not be limited to the longitudinal direction of the front contour but also be provided in a transverse direction of the contour. Between the aforementioned minima and the maximum further extremities can be provided, so that also in transverse direction a plurality of peaks and valleys is given.

Preferably, the maxima and minima are connected in transverse direction by curves, in particular a straight line, a concave curve, a convex curve or a parabolic curve.

In order to obtain both simple manufacturing conditions and good aerodynamic properties, the contour is built with subsections of straight lines connecting maxima and minima of the contours positioned with constant or variable distances from each other. The terms maximum and minimum characterize local extremities of the contour locally protruding in the front or in the back. Transitions between different parts of the curve of subsections with straight lines can be manufactured in a spiky or curved fashion. The contour can be symmetrical to an axis running through an extremity and oriented approximately in the direction of the airflow. Alternatively, it is possible that the contour is asymmetrical to the aforementioned axis, so that the curves or straight lines departing in both directions from that extremity comprise different slopes. This is in particular advantageous if the wing comprises at least subsections being inclined such that the flow medium meets the wing with an inclination respect to the aforementioned axis, wherein the differences in the slope of the contour equal out the local inclination angle.

According to another embodiment of the invention, the straight lines or the contour between a maximum and a minimum comprise an average or absolute sweep of between approximately 20° and 80°, in particular between approximately 20° and 70°, wherein the slope is measured with respect to a plane which is transverse to the flow direction. The angle of the sweep should be adapted to an expected profile of the flight speed, wherein the aforementioned range for the angle of the sweep has shown up to be very effective in connection with planar wings comprising a sweep. The invention transfers these proven successful ranges to the technical area of wings with meandered contours.

The basic ideas of the invention can also be transferred to wings being part of the engine nacelle of an aircraft, a spacecraft or a missile. For instance, the wing can be designed and arranged as an annular wing being located radially external from an engine nacelle. This leads to a reduction of the drag in the inflow area of the engine nacelle.

Also a transfer of the invention to a lift and control surfaces of a missile is possible wherein according to an alternative embodiment a planar wing and/or a control surface are/is meandered. Due to the resulting decrease of the drag the power unit of the missile can be designed with decreased dimensions and/or the maximum range is increased.

Also the use of the inventive wing for the inlet of an air breathing engine of the flying object is possible. According to the invention these inflow areas or a flow channel of the inlet may by limited by one or a plurality of channeling surfaces with meandered leading edges. For such a use the surfaces are supported in the rear areas by adjacent components as for instance the engine nacelle or the flying object itself. The surfaces built flow channels or flow ducts in order to provide an exact air supply, for instance to the engine and in order to influence the flow conditions by means of the supporting, drag and lift properties.

According to a special embodiment of the invention the inventive wing is part of a so called grid fin (or lattice wing) or a fin of such a grid fin.

Grid fins are for instance known from the documents:

[3] (Belotserkovskii S. M. et al., GITTERFLÜGEL (Russian: RESCHET-SCHATYE KRYL'JA), Moskau, Maschinostroenie, 1985, 320 S (Russian) (English translation: Lattice Wings, also called wings with internal framework, machine translated by: Foreign Technology Division United States Airforce, smooth translated original text, errors corrected and retyped by Missile And Space Intelligence Center United States Army, 1985, T. E. Martin, R. T. Wintey, D. Kleenias),

[4] Washington W. D. and Miller M. S., A New Concept for Missile Strability and Control, AIAA Paper, 93-0035, 31st Aerospace Sciences Meeting & Exhibit, January 11–14, Reno, Nev. 1993

[5] Washington W. D. and Miller M. S., Experimental Investigations of Grid Fin Aerodynamics: A Synopsis of Nine Wind Tunnel and Three Flight Tests. MISSILE AERODYNAMICS, RTO-MP-5, 1998, pp. 10-1–10-14,

[6] Fournier E. Y., Wind Tunnel Investigation of Grid Fin and Conventional Planar Control Surfaces, AIM Paper, 2001-0256, 39th Aerospace Sciences Meeting & Exhibit, January 8–11, Reno, Nev., 2001,

[7] EP 829 424 B1, each of which are incorporated entirely herein by reference.

Common grid fins comprise a plurality of thin fins, arranged in a grid-like pattern in order to limit several flow channels. The grid fins are used to influence the aerodynamic behavior of the flying object connected with the grid fins, in particular an aircraft, a projectile, a rocket, a missile or a space vehicle.

Compared to conventional planar wings grid fins provide large effective areas of fins at low weight and small dimensions. So, grid fins provide an effective possibility to influence the aerodynamic properties of a flying object. It has been shown that compared to common designs of wings more uniform flow conditions are established. This is due to the mutual interference between adjacent fins in the inside of the framework. For sufficiently large supersonic speeds of a flying object the flow conditions around single fins of a grid fin are independent from each other. Whereas common planar wings comprise an outer surface inducing aerodynamic forces and an inner structure being responsible for the support, the grid fins work multifunctional due to the fact that the fins both generate aerodynamic forces and build the supporting structure. Such a framework-like design of the grid fins leads to a high stiffness, a large geometrical moment of inertia and a large torsion section modulus.

[3] discloses grid fin configuration, which framework is so bend that the whole grid fin is adapted to the outer shape of the body of the spacecraft. In order to bring the grid fins into the work-position or to vary the work-position, the grid fins can be swing out perpendicular to the body (cp. FIG. V.7 of [3], the cited portion of which is incorporated herein by reference).

According to a preferred embodiment of grid fins, the leading edge contour of the fins comprises a minimum at the margin of one flow channel and a maximum at the other margin of the-aforementioned flow channel. Thus, one connecting curve or straight line between a maximum and a minimum is limiting one flow channel at one side of the flow channel.

The transition from the area of one flow channel to the area of an adjacent flow channel can be provided by identical maxima or identical minima at the margin points (zig-zag-like contour; the "wavelength" of the contour equals the double width of one flow channel in the area of the respective fin) or could be built by a jump from one minimum of one flow channel to a maximum of the adjacent flow channel (saw tooth contour; the "wavelength" of the saw tooth contour equals the length of a flow channel in the range of the respective fin). This embodiment relies on the assumption that the aerodynamic conditions cannot be further improved if the flange of one tooth of the contour extends over more than one flow channel. However, such an extension would lead to an increase of the distance between the maxima and the minima of the meandered contour in the flow direction. Such an increase of the distance between the extremities has a negative impact on the dimensions of the fins in flow direction and a negative impact on the dimension of the grid fins in flow direction.

According to a preferred embodiment of the grid fins, in the area of one flow channel the single fins comprise a central or not centrally arranged maximum as well as two minima each arranged at the margins of the flow channel. According to this embodiment, one "tooth" built with one maximum, two minima and a pair of adjacent curves or straight lines is built in the area of each flow channel.

Alternatively, the present invention includes the possibility that the fin contour comprises a plurality of maxima and a plurality of minima in the area of one flow channel. According to another alternative, the contour of the leading edge comprises a minimum at the center of one flow channel and two maxima each arranged at the margins of the flow channel.

The number of extremities arranged in the area of one flow channel correlates with the length of a connecting curve or straight line. In order to provide a given aerodynamic effect for a fixed slope of the connecting line or curve the number of extremities also determines the distance of the maxima and the minima in flow direction. In case that contours with a small extension in flow direction are desired, for instance for small dimensions of the grid fins in flow direction and/or in order to yield good mechanical properties of the grid fins, an increased number of extremities should be used. This is in particular advantageous if a large slope of the connecting curves or connecting straight lines is required.

According to another embodiment of the invention, the fins of the grid fins are supported by a frame. The frame can be used in order to increase the stiffness of the grid fins as well as in order to connect the grid fins to the flying object. In case that it is desired to change the inclination of the grid fins with respect to the flying object and thus to change the flow direction of the airflow with respect to the grid fins, the grid fins may be linked pivotably with the flying object, for instance by means of a hinge in combination with a suitable actuator. According to another embodiment of the invention, wherein the frame is designed and configured in a multifunctional way the contour of the frame is also meandered. In such case the frame is additionally to the aforementioned functions also used to influence the aerodynamic properties and to strengthen the effect of the meandered fins.

Other features and advantages of the present invention will become apparent to one with skill in the art upon examination of the following drawings and the detailed description. It is intended that all such additional features and advantages be included herein within the scope of the present invention, as defined by the claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. In the drawings, like reference numerals designate corresponding parts throughout the several views.

DETAILED DESCRIPTION

In the following the invention is explained on the basis of a special embodiment which is a grid fin 1. A transfer of the basic principles explained on the basis of the grid fin 1 to any other suitable wing, surface, lifting element, guiding element; steering element or tail unit is possible and included into the subject-matter of the appended claims, for instance surfaces being a part of a nacelle, wings or guiding elements for a flying object, inflow regions or inflow ducts. The combination of different features shown in different figures or mentioned in connection with different uses is also possible.

Figure 1:
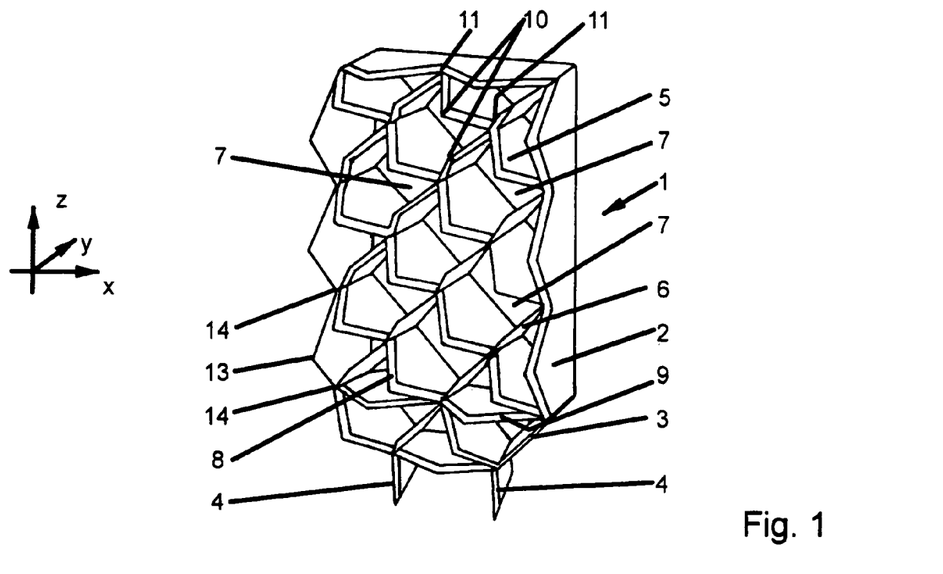
FIG. 1 is a perspective view of one embodiment of a wing according to the invention, here the wing being a single fins of grid fins.

A grid fin 1 is linked in a fixed manner or pivotably linked with a flying object, in particular with an aircraft, a projectile, a rocket, a missile or a space vehicle. The grid fin 1 comprises a frame 2 of rectangular outer shape, the bottom of the frame comprising a tapering 3 with two holding elements 4 extending from the tapering 3. Sets of parallel fins 5 and parallel fins 6 are arranged in a grid-like pattern inside frame 2 and held by the frame. In between fins 5, 6 limit flow channels 7 comprising a rectangular or square cross-section.

The grid fin 1 according to FIG. 1 is subjected to airflow which is directed into the direction of the axis y. Differing from FIG. 1, the grid fin can be inclined with respect to the axis y. The fins 5, 6 comprise leading edges with contours 8, 9, wherein the contours 8, 9 are meandered, in particular zig-zag-shaped, waved or curved back and forth. According to FIG. 1 the fins 5, 6 comprise a maximum 10 which is located centrally with respect to flow channels 7. Additionally, the fins 5, 6 comprise maxima 11 in the margins of one respective flow channel where two fins 6, 5 meet with perpendicular orientation.

The frame 2 has a zig-zag-shaped or meandered contour 12 with maxima 13 and minima 14. The fins 5, 6 are connected to the frame 2 at minima 14 of the frame, wherein also the fins 5, 6 comprise minima 11 in the connection area. Maxima 13 of frame 2 and maxima 10 of fins 5, 6 as well as minima 14 of frame 2 and minima 11 of fins 5, 6 correspond to each other and are arranged in common planes.

Figure 2:
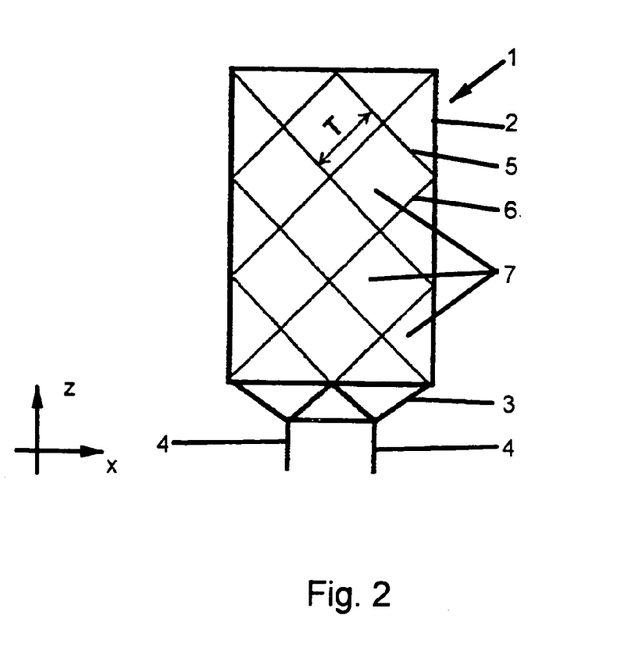
FIG. 2 is a front view of the grid fins according to FIG. 1.

According to FIG. 2 one dimension of the flow channel 7 is termed "T", wherein the dimension T equals the distance of parallel fins 5 (6) and determines the width of the pattern of the grid built by fins 5, 6.

Figure 3:
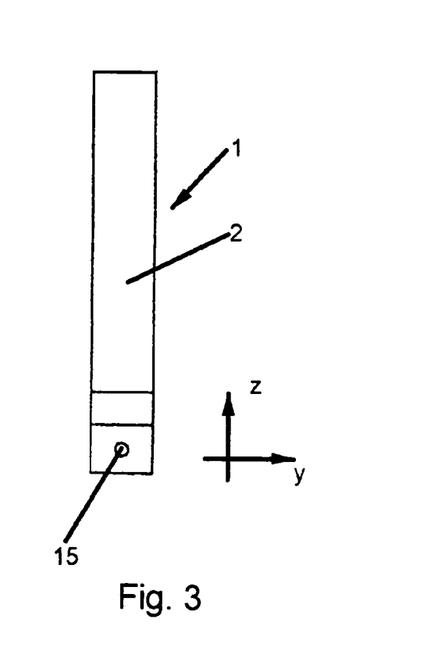
FIG. 3 is a side view of grid fins comprising a frame with a planar contour.

Differing from FIG. 1 the frame 2 shown in FIG. 3 comprises planar front contours. In the view shown in FIG. 3 the fins 5, 6 are covered. Nevertheless, also these fins 5, 6 are meandered. The holding elements 4 comprise bores 15 for receiving an axle for a pivotable support of grid fin 1 with respect to the flying object.

Figure 4:
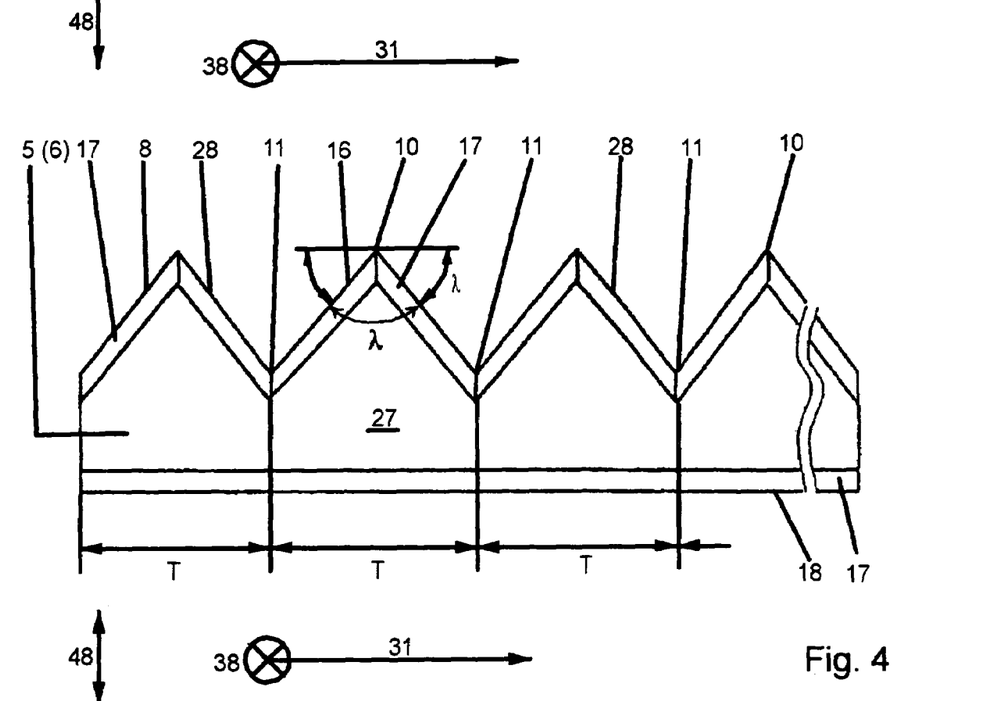
FIG. 4 shows a wing or fin according to the invention with a meandered contour and an opposite straight contour.

FIG. 4 shows one fin 5 (or 6). The maxima 10 and minima 11 of contour 8 are connected by straight lines 16, 28. In the area of flow channel 7 fin 5 has a contour 8 with a minimum 11, a straight section 16, a maximum 10, a straight section 28 and a minimum 11. A couple of the aforementioned sections build one "tooth". The sweep angle λ which is built by the straight sections 16, 28 with respect to an imaginary line perpendicular to the flow direction is preferably between 20° and 70°, in particular approximately between 30° and 60°, for instance approximately between 40° and 50°.

The fin 5 is manufactured from a steel sheet of constant thickness, wherein the steel sheet in the area of the contour 8 comprises bevels 17 on both sides of the steel sheet. The bevels 17 extend over the entire length of contour 8. Fins 5, 6 have a cross-section of hexagonal shape built by two couples of abutting bevels 17 and two basic areas 27 located in between the abutting bevels 17. For the embodiment shown in FIG. 4, the contour 8 of the fins 5 is meandered whereas the opposing contour 18 is built by a straight line or plane. The contour 8 could be the contour of the leading edge (or tailing edge) of a wing or fin, whereas the contour 18 could be the tailing edge (or leading edge) of the wing or fin.

Figure 5:
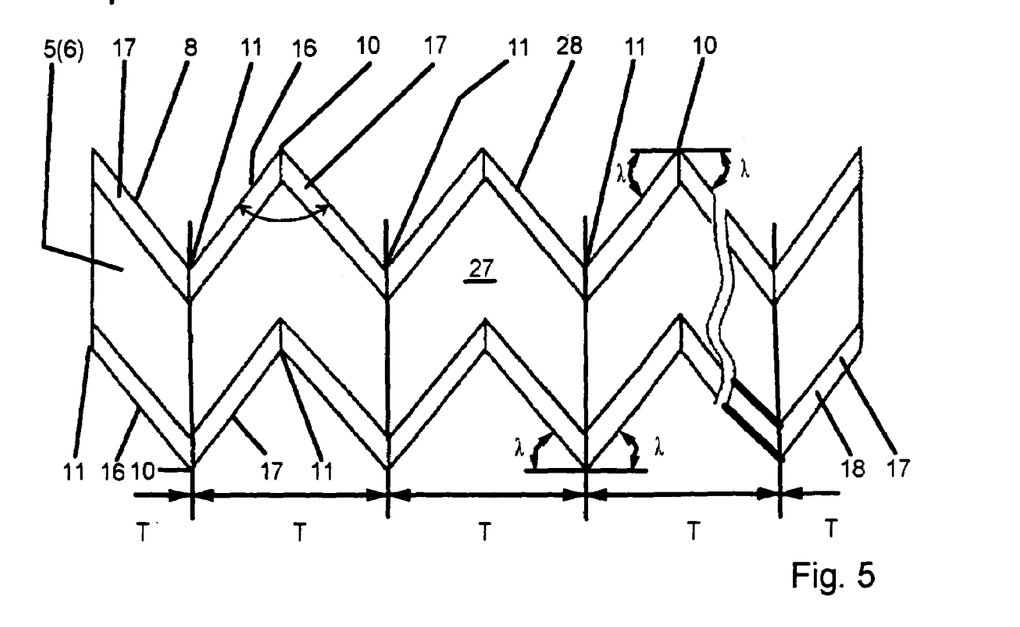
FIG. 5 shows a wing or a fin with two meandered contours of a leading edge and a tailing edge.

For an alternative embodiment according to FIG. 5 also the contour 18 is meandered, wherein also for contour 18 the possible features disclosed for the embodiment according to FIG. 4 apply. The maxima 10 and minima 11 of contours 8, 18 are aligned with respect to axis y.

Figure 6:
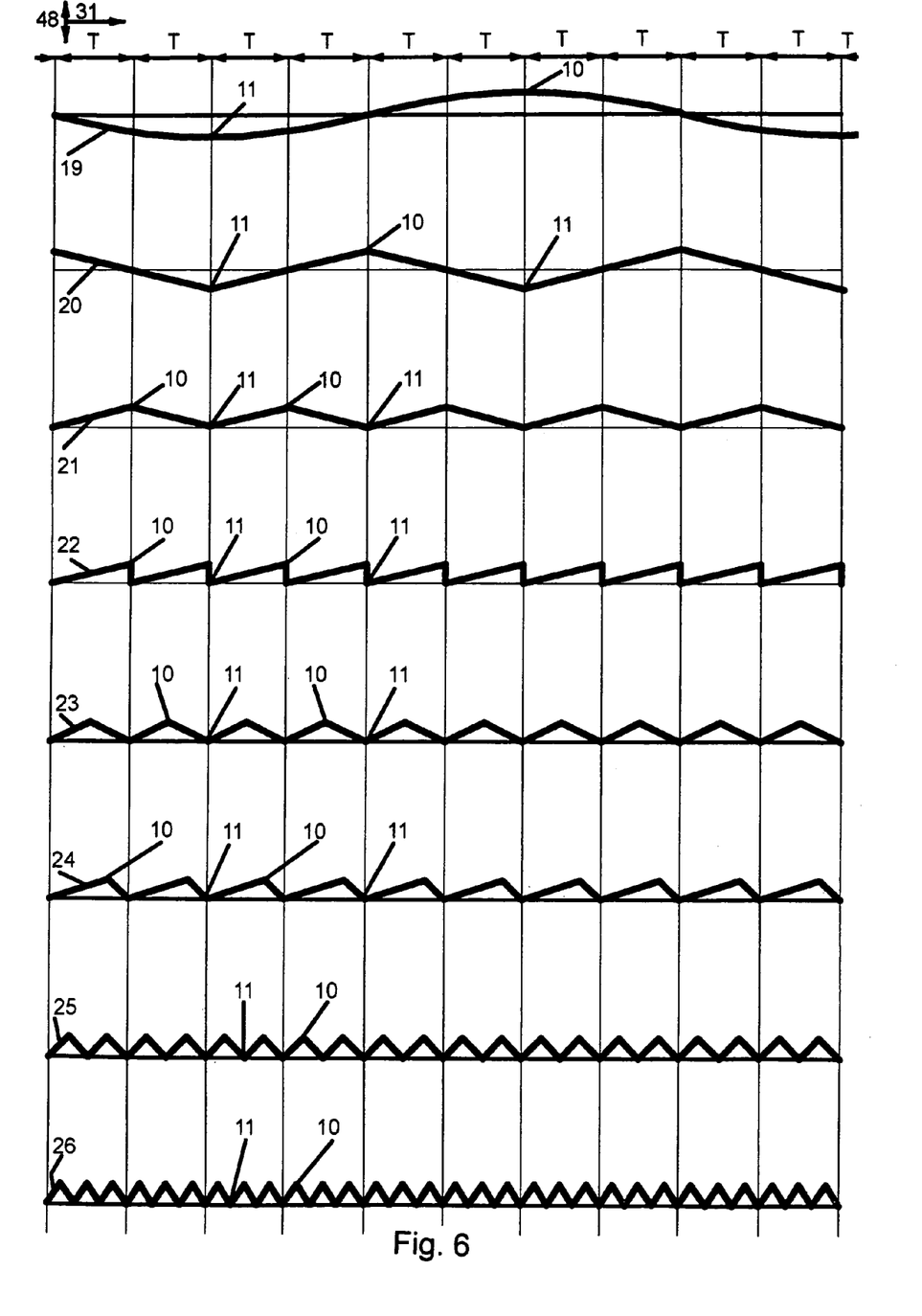
FIG. 6 shows schematic views of different meandered contours according to the invention.

FIG. 6 shows different alternative embodiments of contours 8, 9, 12 and/or 18:

a) Contour 19 is curvilinear, for instance sinusoidal. The distance between adjacent minima 11 for the shape 19 is 8 T.

b) Contour 20 is zig-zag-shaped, wherein minima 11 and maxima 10 are connected by straight sections. Maxima 10 are arranged in the middle between two adjacent minima 11. The distance between adjacent maxima is 4 T.

c) Contour 21 is zig-zag-shaped similar to contour 20, wherein the distance between adjacent maxima 10 is only 2 T. A comparison of contour 21 with contour 20 shows that for the same slope of the straight sections between maxima 10 and minima 11 the distance of the maxima 10 and minima 11 is halved in flow direction.

d) Contour 22 is sawtooth-shaped. In opposing margins of a flow channel, the contour has one minimum 11 and one maximum 10, the minimum 11 and maximum 10 being connected by straight sections. From the maximum 10 the contour jumps immediately to minimum 11 of an adjacent flow channel.

e) Contour 23 is zig-zag-shaped according to contour 20, wherein the distance between adjacent maxima 10 is only T.

f) Contour 24 is zig-zag-shaped, wherein the distance between one maximum 10 and one minimum 11 is smaller than the distance from one minimum 11 to the next maximum 10, so that the straight sections of the contour comprise different lengths. The distance of adjacent maxima 10 is T.

g) Contour 25 is zig-zag-shaped according to contour 20, wherein the distance between adjacent maxima 10 is only T/2.

h) Contour 26 is zig-zag-shaped similar to contour 20, wherein the distance between adjacent maxima 10 is only T/3.

The different contours shown in FIG. 6 can be varied for alternative embodiments, for example with the same shape, but with different distances between the maxima 10 and minima 11, with displacements of the contours with respect to the grid pattern and to the flow channels 7, with curves instead of sharp edges and/or with differing or any lines or curves between the maxima 10 and minima 11. For opposing contours 8, 18 the same or differing curves and shapes can be used.

FIG. 1 shows only one possible embodiment of a basic form of a grid fin 1 with rectangular and planar shape comprising flow channels with equal rectangular or square cross-sections. Differing from this embodiment, grid fins with any form and also cranked grid fins can be used wherein also for these embodiments the contours 8, 9, 12, 18 are meandered. Other possible shapes of grid fins are disclosed in the document [1] wherein FIG. 2.11, FIG. V.1, FIG. V.2, FIG. V.7 and FIG. 1.1 of [1] show different basic designs of grid fins, the cited portions of which are incorporated herein by reference. Each of these basic designs may be suitable to be changed according to the invention providing a meandered contour.

The fins 5, 6 can be built by one integral part extending over a plurality of flow channels 7. If this is the case, the fins 5, 6 may have slots directed in the direction of axis y. Fins 5, 6 can be plugged into each other by means of the aforementioned slots. Additionally or alternatively, the fins 5, 6 can be connected by welding. It is also possible that the fins 5, 6 are built by a plurality of single elements, these single elements for instance being connected by a glue or by welding. For connecting fins 5, 6 alternative embodiments are shown in document [1], cp. FIG. 1.7, the cited portion of which is incorporated herein by reference, wherein also the embodiments shown in this document may be modified to have a meandered contour according to the invention.

As an alternative to the hexagonal cross-section with four bevels 17 according to FIG. 4 and FIG. 5, it is also possible that the fins 5, 6 comprise a diamond-shaped cross-section, a quadrangular cross-section, a triangular cross-section, a sinusoidal cross-section, a cross-section built with sections of a circle or a parabola as well as unsymmetrical parabolic cross-sections, see also document [1], table 4.1, the cited portion of which is incorporated herein by reference.

It is also possible that the flow channels 7 each have different contours or cross-sectional areas or orientations with respect to each other or with respect to the frame 2. Furthermore, it is possible that one grid fin comprises a plurality of different flow channels 7.

Grid fin 1 is preferably used for stabilizing devices for flying objects, for tail units, for wings or for so-called "hydrofoils". The use of the grid fin is in particular possible for subsonic, transonic or supersonic speed ranges.

In the shown embodiments, the measure T correlates with the width of the flow channel limited by the fins. The wavelength of the meandered contour may be smaller than 2 T or may equal 2 T. In particular the wavelength is smaller 1 T or equals 1 T. In particular, the wavelength is smaller than the overall width of the grid fin or the frame or the overall extension of the fin.

Figure 7:
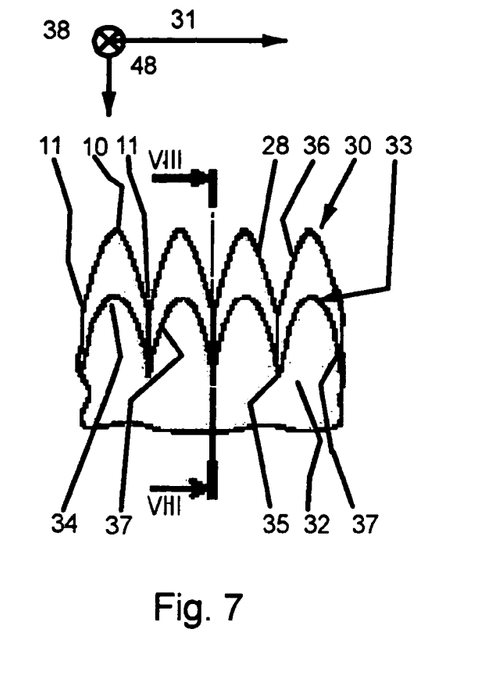
FIG. 7 shows a wing or fin according to the invention with a contour being meandered in longitudinal direction and being slanted in transverse direction.
Figure 8:
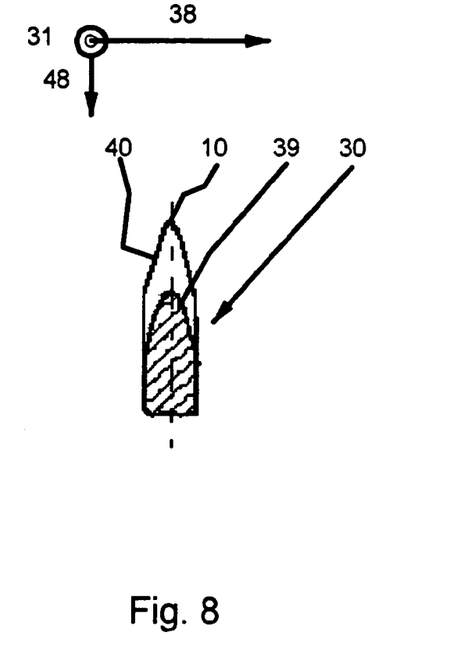
FIG. 8 shows the wing or fin according to FIG. 7 in a sectional view taken along plane VIII–VIII.

FIG. 7 shows one wing 29 with a meandered contour 30 in longitudinal direction 31. According to FIG. 7 a bevel 17 is not planar but built by a curved plane or domed plane. In the transition region of this plane to the side area 32 a transition contour 33 is built, the transition contour comprising maxima 34 and minima 35. In the view according to FIG. 7, maxima 34 of transition contour 33 and minima 10 of contour 30 are aligned to each other in vertical direction. A connecting contour 36 of contour 30 that connects maxima 10 and minima 11 is shaped similar to a parabola or is approximately elliptically shaped. Also transition contour 33 comprises corresponding connecting contours 37. Both the contour 30 and the transition contour 33 are built with a continuous transition between the contours 30, 33 in transverse direction 38. The sectional view VIII—VIII according to FIG. 8 shows the wing 29 in the region of minima 11, 35 with the contour 39 in transverse direction 38 as well as the teeth in the area of maxima 10, 34 with contour 40 in transverse direction 38. Contours 39, 40 according to FIG. 8 have a convex shape. For the embodiment shown in FIGS. 7 and 8 the maxima 34 correspond approximately with the minima 11. However, also embodiments deviating from this principle are possible.

Figure 9:
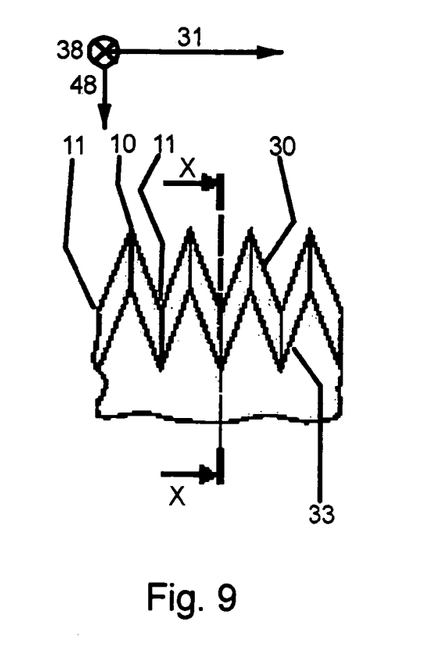
FIG. 9 shows another wing or fin with a contour being meandered in longitudinal direction and being slanted in transverse direction.
Figure 10:
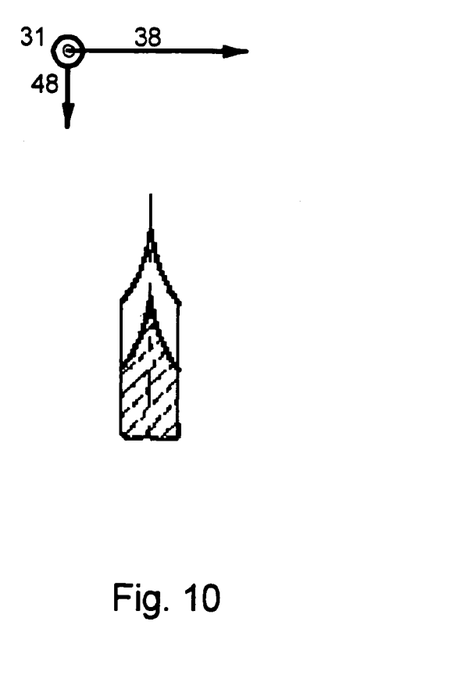
FIG. 10 shows the wing or fin according to FIG. 9 in a sectional view taken along plane X—X.
Figure 11:
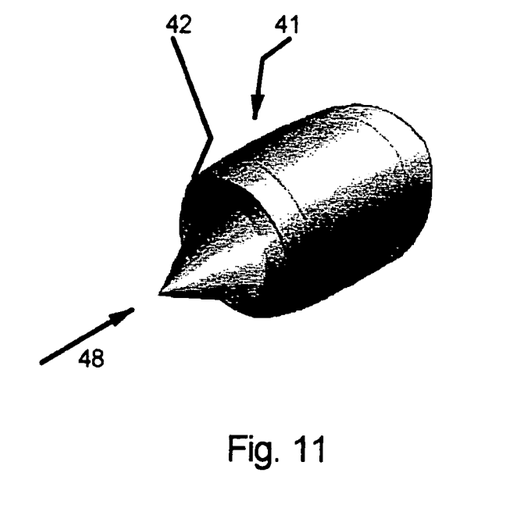
FIG. 11 shows a common engine nacelle—with an annular wing being located radially externally from the other components of the engine nacelle.

FIGS. 9 and 10 show another embodiment of the wing 29, wherein the contour 30 and the transition contour 33 are built with linear subsections between maxima 10 and minima 11 as well as between maxima 34 and minima 35. In transverse direction 38 the contour 30 and transition contour 33 according to FIG. 11 are connected by a contour 39, the contour 39 being of convex shape on both sides of minima 11. Contour 40 is also shaped in a convex manner on both sides of maxima 10 so that a slightly domed bevel 17 results. From the embodiments shown in FIG. 8 and FIG. 10 it may be seen that the tips of the teeth can be designed to be spiky or curved, at least in transverse direction.

According to the embodiments shown in FIGS. 7 to 10 maxima 10 and 34 as well as minima 11 and 35 are aligned with each other in transverse direction 31. Due to the meandered shape the wing 29 comprises a local sweep, wherein the wing 29 does not comprise a global sweep. However, it is also possible that the wing 29 comprises a local sweep due to a meandered contour as well as a global sweep. The ratio of the wavelength of the meandered contour to the length of an edge as well as the ratio of the length of one tooth to its depth have an upper limit of 1 and can be as small as desired. In FIGS. 7 to 10 the shown sectional planes VIII—VIII and X—X have a parallel orientation with respect to the flow direction.

FIG. 11 shows an engine nacelle 41, for instance an engine nacelle used for the supersonic aircraft SR-71 "Blackbird". At the inflow region the engine nacelle comprises an annular wing 42 which could in a first approximation be described as being of the shape of a hollow cylinder. The annular wing 42 has a free end region, which builds a contour confronting the flow air, and an opposite end region, which is connected to other parts of the aircraft or to a housing of the engine nacelle 41.

Figure 12:
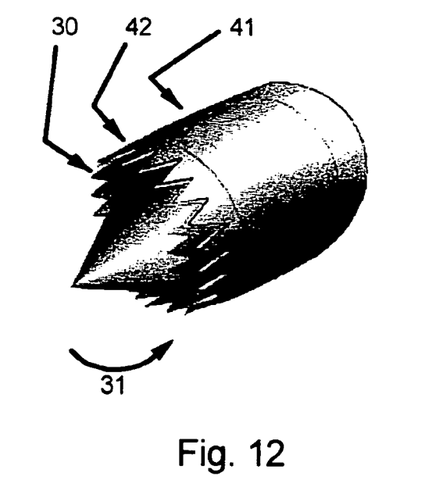
FIG. 12 is an engine nacelle with an annular wing comprising a meandered contour.

FIG. 12 shows the transfer of the invention to an engine nacelle 41 wherein in this case the contour 30 directed towards the flow air stream is designed corresponding to the embodiments disclosed for the wing 29 or fins 5, 6. The annular wing 42 in connection with a conical central element 43 builds a tapered channel with annular cross-section. The circumference of the annular wing 42 is a multiple of the wavelength of the shown teeth, so that a plurality of waves is arranged in the periphery of annular wing 42.

Figure 13:
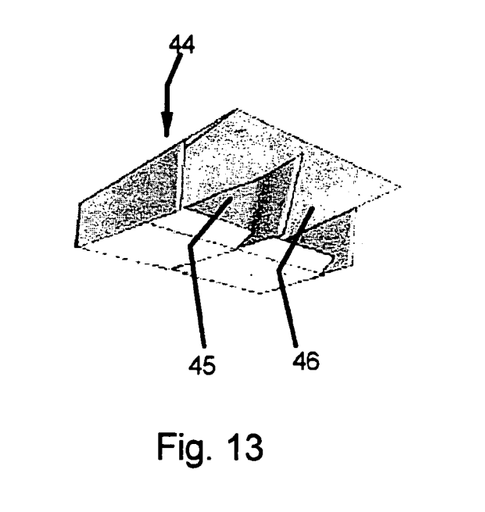
FIG. 13 shows the intake of a flying object or an engine nacelle in perspective view.

FIG. 13 shows air inlet 44, here to abutting inflow air channels 45, 46. Each inflow air channel 45, 46 is limited in its periphery by a wing 29 or a fin 5, 6 according to the aforementioned embodiments wherein a central separating wall for the inflow air channels 45, 46 is built by one integral fin 5, 6 or one wing 29. Inlets 44 are for instance used for an aircraft called "EUROFIGHTER".

Figure 14:
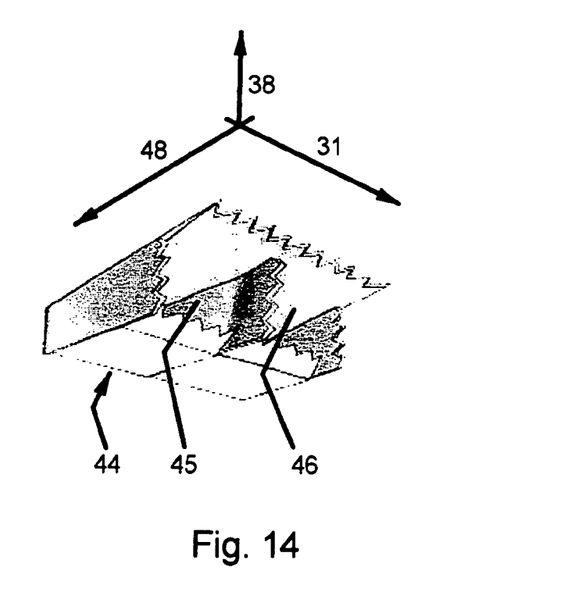
FIG. 14 is a perspective view of the intake of a flying object or an engine nacelle according to the invention, wherein the leading edges comprise a meandered contour.

FIG. 14 shows the transfer of the present invention to an inlet 44 wherein the wings 29 or fins 5, 6 limiting inflow air channels 45, 46 are meandered at the upstream contour according to the aforementioned embodiments. Single wings 29 can be shifted with respect to each other in the direction of the airflow, so that the maxima 10 and 34 and the minima 11, 35 are not necessarily located in a common plane defined by transverse direction 38 and longitudinal direction 31.

Figure 15:
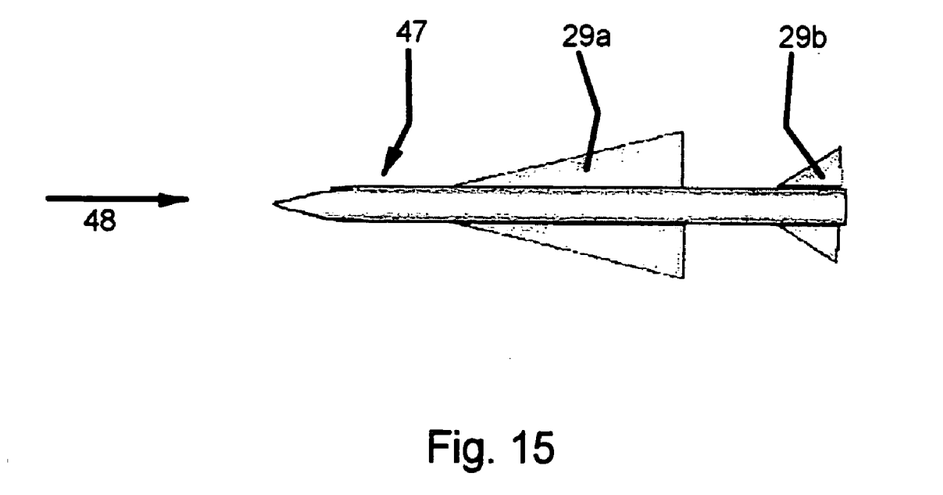
FIG. 15 shows a missile with a global sweep of the leading edges for both the wings and the tail unit.
Figure 16:
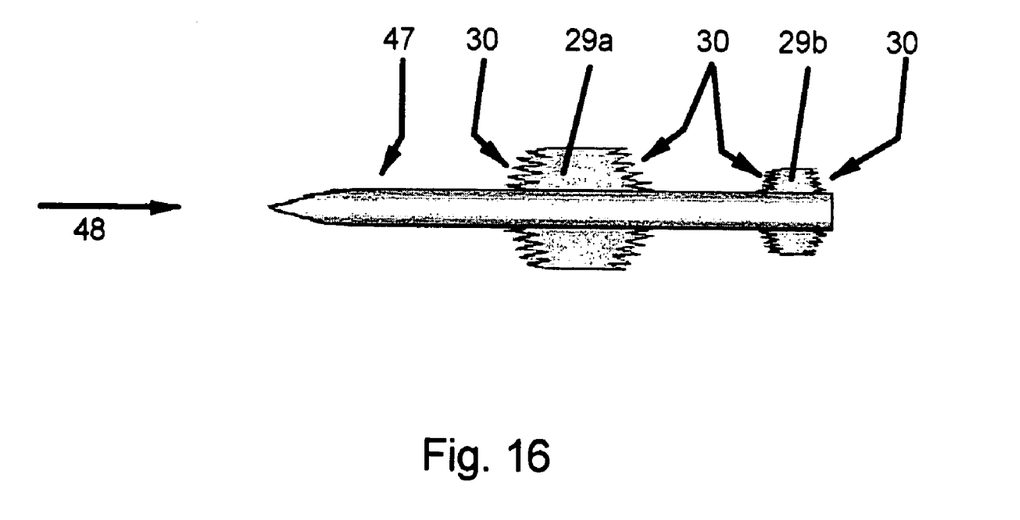
FIG. 16 shows a missile with a global sweep of the leading edges for both the wings and the tail unit and meandered contours.

FIG. 15 shows a common missile 47 with wings 29a, 29b each comprising a global sweep. However, FIG. 15 shows wings 29a, 29b with different sweep angles. FIG. 16 shows the transfer of the present invention to a missile 47. According to FIG. 16 both the leading edges and the trailing edges of wings 29a, 29b both comprise a global sweep as well as a locally meandered contour. Due to an optimized combination of the global sweep and the local sweep of the leading edges of the wings, fins and tail units low pressure/wave drag at high speeds (in particular due to the large local sweep) can be combined with an increased performance for lower speed (in particular due to the moderate global sweep).

For supersonic speeds the positive effect of the local sweep of the leading edges of wings should be similar to that of globally swept planar wings. Under the assumption that a simple comparison of different shapes of wings for a planar wing (rectangular wing, delta-wing, arrow wing and others) is also suitable for the disclosed inventive configurations a prediction of the physical advantages of the inventive design may be tried. According to [2], which is incorporated entirely herein by reference, a rectangular wing shows for a Mach number of 4 a maximum lift-to-drag ratio of 3.9 and a comparable delta-wing with a sweep of 60° comprises a lift-to-drag ratio of approximately 5.8. This leads to an improvement of nearly 50%. These values do not consider an interference of adjacent teeth, so that the given values should be seen only as a very rough approximation.

For transonic speeds the configuration and design according to the invention could lead to the advantage that the local sweep of the leading edges leads to smaller effective Mach numbers and, as a consequence, to smaller pressure drags.

As another advantage very large sweep angles can be realized without the ratio of the wingspan to the depth of the wing exceeding undesired small values. For instance, a wing or fin with a meandered or teethed leading edge has for the same size and for comparable sweep angles a significantly smaller depth of the wing than a comparable wing which comprises a global sweep (cp. FIG. 16). This means that the expected increase of the lift force is much higher without a significant change of the wave drag. On the other hand, a larger ratio of the wingspan and the depth of the wing would result in smaller moments at the hinges of a tail unit which could result in smaller actuators and in energy savings. The effect of the wings with increased wingspan located at the body of the flying object could also be advantageous due to the fact that the influence of a relatively thick boundary layer of the body could be decreased.

Besides manufacturing the wing 29 with the meandered contours according to the invention also common wings 29 can be connected to additional components comprising meandered contours so that also for commonly built and existing wings a subsequent improvement could be provided.

In the figures longitudinal axis 31 denotes an axis which is directed along the contours. A transverse axis 38 extends approximately into the direction of the thickness of the wing. For example, the longitudinal axis 31, the transverse axis 38 and the flow direction 48 build an orthogonal system for a wing without sweep. Differing from the shown embodiments, the longitudinal axis 31 could also be a slanted or curvilinear axis, for instance in case that the wing is an annular wing. The curvilinear longitudinal axis could also be adapted to a global sweep of the wing.

For wings or wings for other uses than the shown grid fins, the shapes shown in FIG. 6 can also be used. In case that
T denotes the width of one single flow channel or
for annular wings or wings T denotes the length of the corresponding edge or
for a wing T denotes the path of the wingspan or
for an annular wing T denoting the circumferential length,
the wavelength of the meandered shape should be chosen smaller than 1 T and in particular smaller than 0.5 T.

Many variations and modifications may be made to the preferred embodiments of the invention without departing substantially from the spirit and principles of the invention. All such modifications and variations are intended to be included herein within the scope of the present invention, as defined by the following claims.

I claim:

1. Wing for an aircraft or spacecraft,
said wing being designed and arranged to be moved with transonic or supersonic speeds,
said wing comprising a leading edge and a trailing edge,
wherein at least one of the group of said leading edge and said trailing edge comprises a meandered contour,
wherein said wing is designed and arranged to build a part of a grid fin, said leading edge and said trailing edge and said meandering contour being built by at least one fin of said grid fin, said fin limiting an airflow channel.

2. Wing according to claim 1, wherein said meandered contour is comprises a global sweep.

3. Wing according to claim 1, wherein said meandered contour comprises a maximum protruding from the wing and two minima arranged laterally from said maximum.

4. Wing according to claim 2, wherein said meandered contour comprises a maximum protruding from the wing and two minima arranged laterally from said maximum.

5. Wing according to claim 3, wherein said maximum and at least one of said minima are connected by a straight line, a concave line, a convex line or a parabolic line.

6. Wing according to claim 1, wherein said meandered contour comprises sections built by straight lines connecting maxima and minima of said meandered contour.

7. Wing according to claim 6, wherein said meandered contour comprises a sweep with a sweep angle λ between 20° and 80° between said maximum and one adjacent minimum of said minima.

8. Wing according to claim 6, wherein said meandered contour comprises a sweep with a sweeping angle λ between 20° and 70° between said maximum and one adjacent minimum of said minima.

9. Wing according to claim 1, wherein said meandered contour comprises a minimum and a maximum said maximum and minimum being arranged marginally with respect to said airflow channel.

10. Wing according to claim 1, wherein said meandered contour comprises minima at the respective margins of said airflow channel and a maximum in between said minima.

11. Wing according to claim 1, wherein said meandered contour comprises maxima at the respective margins of said airflow channel and a minimum located centrally between said maxima.

12. Wing according to claim 1, wherein said meandered contour comprises a plurality of maxima and a plurality of minima in the area of said airflow channel.

13. Wing according to claim 1, wherein said at least one fin of said grid fin is supported by a frame.

14. Wing according to claim 13, wherein at least one front contour of said frame comprises a meandered contour.

15. Wing according to claim 13, wherein a cross-section of said at least one fin of said grid fin comprises the outer shape of one of the group of a rhombus and a hexagon.

\* \* \* \* \*